United States Patent
Hauf (10) Patent No.: US 7,528,348 B2
(45) Date of Patent: *May 5, 2009

(54) APPARATUS AND METHOD FOR MEASURING THE TEMPERATURE OF SUBSTRATES

(75) Inventor: Markus Hauf, Ichenhausen (DE)

(73) Assignee: Mattson Technology, Inc., Fremont, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 11/021,915

(22) Filed: Dec. 22, 2004

(65) Prior Publication Data

US 2006/0027558 A1 Feb. 9, 2006

Related U.S. Application Data

(63) Continuation of application No. 09/913,269, filed on Nov. 16, 2001, now Pat. No. 6,847,012.

(51) Int. Cl.
*G01J 5/06* (2006.01)
*G01J 5/08* (2006.01)
*F27B 5/18* (2006.01)

(52) U.S. Cl. ................ 219/411; 219/390; 392/416; 118/725; 118/50.1

(58) Field of Classification Search .......... 219/390, 219/405, 411; 392/416, 418; 118/724, 725, 118/80.1; 374/121, 123, 126–132; 250/492.1, 250/504 R See application file for complete search history.

(56) References Cited

U.S. PATENT DOCUMENTS

| 4,528,452 | A | * | 7/1985 | Livesay | 250/492.2 |
| 5,061,084 | A | * | 10/1991 | Thompson et al. | 374/127 |
| 5,252,132 | A | * | 10/1993 | Oda et al. | 118/725 |
| 5,442,727 | A | * | 8/1995 | Fiory | 392/416 |
| 6,191,392 | B1 | * | 2/2001 | Hauf et al. | 219/411 |
| 6,222,990 | B1 | * | 4/2001 | Guardado et al. | 392/416 |
| 6,301,434 | B1 | * | 10/2001 | McDiarmid et al. | 392/416 |
| 6,369,363 | B2 | * | 4/2002 | Hauf et al. | 219/411 |
| 6,462,315 | B2 | * | 10/2002 | Hauf | 219/502 |
| 2001/0010308 | A1 | * | 8/2001 | Hauf et al. | 219/411 |
| 2007/0076780 | A1 | * | 4/2007 | Champetier | 374/121 |

* cited by examiner

*Primary Examiner*—Joseph M Pelham
(74) *Attorney, Agent, or Firm*—Dority & Manning, P.A.

(57) ABSTRACT

An apparatus for measuring an object temperature of an object, and including at least one heating apparatus having at least one heating element for heating an object via electromagnetic radiation. Also included is at least one first radiation detector that detects radiation coming from the object within a first field of vision, and, for determining correction parameters, a measuring device that detects the electromagnetic radiation that reaches the first field of vision from the at least one heating element up to a proportionality factor or a known intensity-dependent function.

7 Claims, 8 Drawing Sheets

APPARATUS AND METHOD FOR MEASURING THE TEMPERATURE OF SUBSTRATES

RELATED APPLICATIONS

This application is a continuation of Ser. No. 09/913,269 filed Nov. 16, 2001, now U.S. Pat. No. 6,847,012.

BACKGROUND OF THE INVENTION

The present invention relates to a method and an apparatus for measuring the temperature of substrates, in particular semiconductor substrates or wafers, with at least one radiation detector for measuring the radiation emitted by the substrate, and an element that restricts the field of vision of the radiation detector and that is arranged between the substrate and the radiation detector. The invention furthermore relates to an apparatus for measuring an object temperature of an object, with at least one heating apparatus including at least one heating element for heating the object by means of electromagnetic radiation, with at least one first radiation detector that detects the radiation coming from the object within a first field of vision.

The invention described in greater detail in the following is used advantageously in so-called RTP (rapid thermal processor) systems in which wafers undergo thermal processing. RTP systems and the rapid heating process used in these systems are known from publications DE 4 437 361 C, DE 4 012 615 C, DE 4 223 133 C, or D 4 41 439 1A, as well as from U.S. Pat. Nos. 5,226,732, 5,359,693, and 5,628,564. Additional rapid heating processes and apparatus are described in the following publications: J. Nackos: 2nd International Rapid Thermal Conference, RTP '94. Monterey Calif., Proc. p. 421-428 (1994); Arun K. Nanda, Terrence J. Riley, G. Miner et. al.: "Evaluation of Applied Materials Rapid Thermal Processor Using SEMATECH Metrologies for 0.25 µm Technology Thermal Applications" Part II, Presentation at the Rapid Thermal and Integrated Processing Conference MRS Spring Meeting '96, San Francisco Calif.; Terrence F. Riley, Arun K. Nandam, G. Miner, et. al.: "Evaluation of Applied Materials Rapid Thermal Processor Using SEMATECH Methodologies for 0.25 µm Technology Thermal Applications" Part I, ibid; R. Bremsensdorfer, S. Marcus, and Z. Nenyei: "Patterns Related Nonuniformities During Rapid Thermal Processing", presentation at the Rapid Thermal and Integrated Processing Conference MRS Spring Meeting '96, San Francisco Calif., and subsequently published document by Z. Nenyei, G. Wein, W. Lerch, C. Grunwald, J. Gelpey, and S. Wallmüller: "RTP Development Requirements", presented at RTP '97 Conference Sep. 3-5, 1997 New Orleans. In all of these methods it is necessary to measure the temperature at at least one point or surface section of the object, substrate, or wafer, or the entire substrate surface during the thermal processing procedure. In general, provided for temperature measurement is at least one radiation detector, for instance a wafer pyrometer, that measures the electromagnetic radiation coming from the wafer inside a field of vision that is defined by an optical device, for instance by a field stop shield or restrictor, that in general is a circular apertured plate. The wafer is heated by the electromagnetic radiation (largely thermal or infrared radiation) from heat sources, in particular from rod lamps that produce longitudinal virtual images on the wafer. For instance, at wafer temperatures greater than about 600° C., a wafer made of silicon acts like a mirror with reflectivity of approximately 30%, so that the mirroring property of the wafer produces virtual images of the rod lamps or heating device. The following is a simplified discussion of virtual images on the wafer or substrate or object.

During the temperature measurement, a differentiation is made essentially between systems heated on one side and systems heated on two sides. Systems heated on one side heat the wafer largely from only one side. In contrast, the temperature is measured on the other side, for instance by means of a wafer pyrometer. This determines a radiation that is largely unaffected by the lamp radiation and that is emitted by the wafer or a substrate, by means of which the substrate temperature is calculated.

Figure 10:
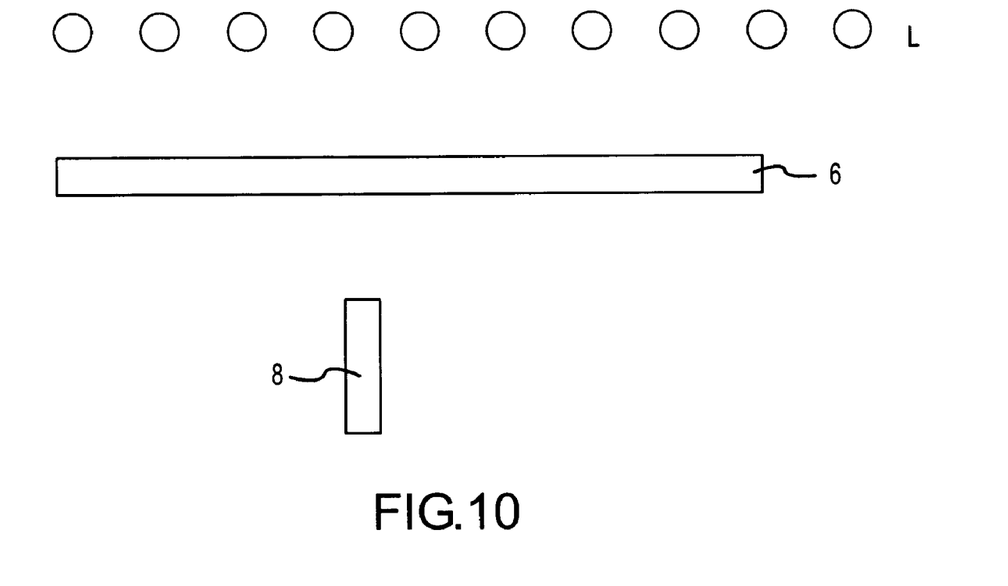
FIG. 10 is a schematic drawing of an RTP system with one-sided heating, in accordance with the prior art.

FIG. 10 illustrates a system heated on one side. The substrate 6 is heated by a bank of lamps L arranged on one side of the substrate 6. The radiation emitted by the object is measured by a wafer pyrometer 8 that is arranged on the side opposite the bank of lamps.

In the one-sided heating systems it is disadvantageous that the speed at which the substrate is heated is limited due to the one-sided heating, whereby in general additional undesired temperature gradients caused by structures on the substrate surface occur within the substrate, in particular when the structures are formed or are present on the side of the substrate that faces the heat source. Furthermore, as a rule the chamber in which the substrate is processed is highly reflective in systems with one-sided heating. This highly reflective chamber limits the rate at which the substrate cools, which is disadvantageous in many processes. An additional disadvantage is that deposits such as condensation can occur when chamber walls are highly reflective, which changes the reflectivity of the walls, causing a temperature drift.

The aforesaid disadvantages can be substantially reduced, and to some extent avoided altogether, in a two-sided heating system such as that described, for instance, in DE 44 37 361, because in two-sided heating systems the substrate is heated from above and from below and therefore in general there is no need for a highly reflective chamber. Furthermore, greater heating speed can be achieved due to the heating on both sides. Since the substrate is also heated from the back side, which in general has no structures, the aforesaid temperature inhomegeneities caused by structures on the substrate surface can be substantially reduced. However, in contrast to the one-sided heating system, when there is two-sided heating the radiation measured by the wafer pyrometer is overlaid with an interfering radiation coming from the lamps due to the reflective properties of the substrate. The light reflected on the substrate and coming from the lamps, and the virtual lamp images resulting therefrom, appear more or less diffuse for the wafer pyrometer depending on the roughness of the substrate surface.

Figure 11:
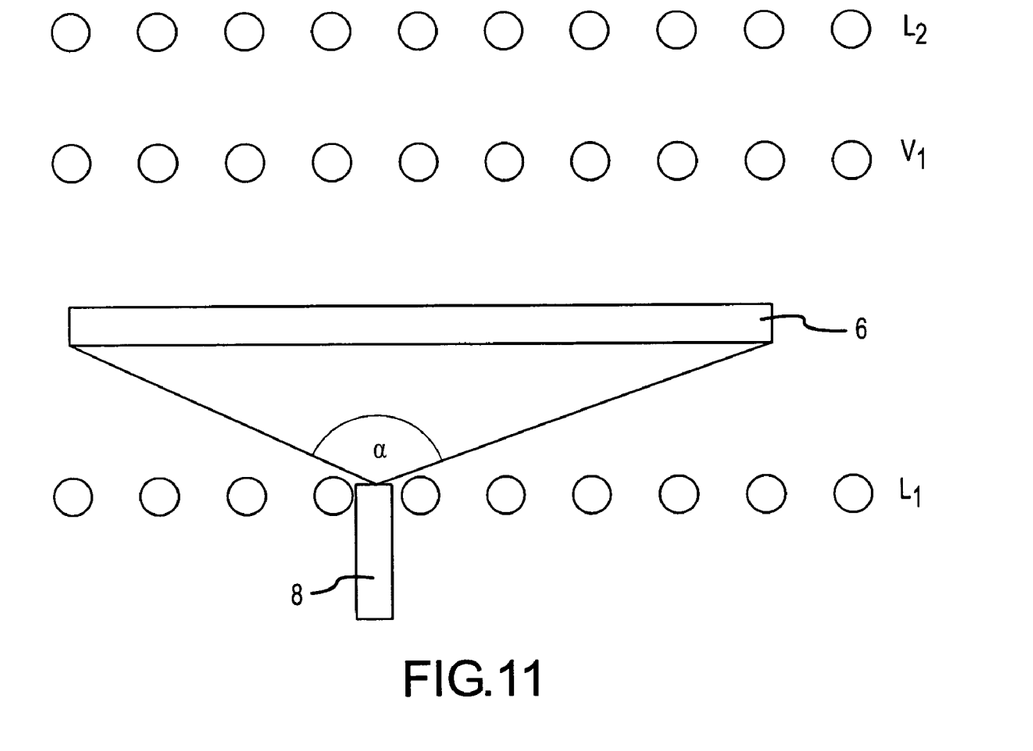
FIG. 11 is a schematic drawing of an RTP system with two-sided heating, in accordance with prior art; and, FIG. 12 is a schematic drawing of an RTP system that is heated on two sides and that has a wafer pyrometer and a lamp pyrometer.

FIG. 11 illustrates a two-sided heating system that includes banks of lamps L1 and L2 on both sides of the substrate 6. Also shown are the virtual images V1 of the bank of lamps L1 occurring on the substrate 6 due to reflection. The banks of lamps L1, L2 can be arranged such that their virtual images cover those of the other bank of lamps. As can be seen in FIG. 11, the wafer pyrometer, within a field of vision, measures both the radiation $I_w$ emitted from the wafer and a part of the lamp radiation $I_i r_i$ determined by the reflecting properties of the substrate, whereby $I_i$ is the lamp intensity of the $i^{th}$ lamp of the bank of lamps L1 and $r_i$ is an effective reflection coefficient of the substrate associated with lamp i.

If the substrate is made of silicon, when temperatures are less than 600° C. the overlay with the interfering radiation occurs both in one-sided heating systems and in two-sided heating systems, since silicon is transparent for infrared radiation in this temperature range, and the wafer pyrometer thus also detects a lamp radiation transmitted through the substrate.

The wafer pyrometer thus detects a radiation coming from the lamps, transmitted through the wafer, and reflected on the wafer, as well as a radiation emitted by the wafer, whereby the portion of the individual components depends on the coating of the substrate, the substrate thickness, and/or the substrate temperature. In order that the transmitted and reflected intensity of the lamps and their virtual images do not cause a false measurement result of the pyrometer, a part of the heat radiation of the lamps can be forwarded via a plurality of fan-like channels to a lamp pyrometer. The intensity measured in this manner can be used for correcting the intensity measured by the wafer pyrometer. The lamp pyrometer is inserted upstream of an imaging means, preferably a cylindrical lens that largely restricts the field of vision of the lamp pyrometer to a rectangle. The virtual images of the lamps move relative to the limits of the field of vision of the wafer pyrometer due to the vibrations that occur during the thermal processing procedure and due to thermally caused deformations and tilting of the wafer, so that changes occur in the intensity of the heat radiation measured by the wafer pyrometer. In particular this skews the amount of lamp radiation by reflection, which results in an error in the temperature measurement. If, for instance, during the measurement of the heat radiation with the wafer pyrometer, an apertured plate is used that restricts the field of vision between the wafer and the wafer pyrometer, fluctuations in intensity occur due to the round, continuous edge of the limited field of vision of the wafer pyrometer. This skews the measurement values for the temperature of the wafer surface.

In the RTP systems cited above, the heating apparatus generally includes a plurality of heating elements, for instance in the form of rod lamps, so that the electromagnetic radiation of each heating element can be individually adjusted by means of a suitable control apparatus. Not only does the option for the control result in numerous advantages in terms of temperature homogeneity across the wafer surface and flexibility with regard to the heating process, it also results in disadvantages for determining the temperature of the substrate or wafer, in particular when conventional wafer and lamp pyrometers are used. Thus, as described above, elements of the pyrometer, or more generally of the temperature sensors, that restrict the field of vision can have a negative effect on temperature measuring accuracy, especially when the intensities of the wafer and lamp pyrometers are compared for measuring the temperature in order, for instance, to correct the effect of the reflection of the lamp radiation on the substrate surface. For example, the vibrations of the substrate cited above, for instance, but also possible changes in intensity of individual heating elements in the heating apparatus, can interfere with the measurement result, in particular when the heating apparatus does not radiate uniformly in space.

Known from DE 41 14 367 A1 is a pyrometer for contactless temperature measurement of running measurement objects in which a cylindrical lens is provided for bundling the radiation coming from the measurement object.

Publications JP 5-187922 (A) in Patent Abstract of Japan, Sect. P, Vol. 17 (1993), No. 609 (P-1640) and DE-OS 21 50 963 indicate and describe contactless measurement of temperatures of an object, whereby a rectangular shield is provided between an optical member and an element that receives the radiation.

U.S. Pat. No. 5,061,084 indicates and describes an RTP system in which two pyrometers are provided, which system measures the radiation emitted by the object to be measured and the environment and the radiation emitted by the environment alone.

WO 94/00744 A1 indicates and describes an RTP system in which a radiation measurement device measures the radiation emitted by the wafer to determine its temperature, whereby one additional radiation measuring device is provided that measures the radiation emitted by the lamps.

U.S. Pat. No. 5,841,110 describes an RTP system in which two pyrometers are provided for measuring the wafer temperature and the ambient temperature or lamp temperature.

The object of the invention is to suggest and provide a method and an apparatus for measuring the temperature of substrates, with which method and/or apparatus it is possible to correctly and simply determine the substrate temperature, even when the substrate vibrates or tilts.

SUMMARY OF THE INVENTION

Starting with an apparatus known from DE-OS 41 14 367 for measuring the temperature of substrates, in particular semiconductor wafers, with at least one radiation detector for measuring the radiation emitted by the substrate, and a restrictor that restricts the field of vision of the radiation detector and that is arranged between the substrate and the radiation detector, whereby the edges of the restrictor are essentially straight lines, this object is inventively achieved in that the restrictor is a polygonal restrictor.

The limitation in the field of vision that is achieved in this manner in the radiation detector for measuring the radiation emitted by the substrate, for instance in a pyrometer, offers the advantage over the previously known circular restriction in the field of vision using an apertured plate that the field of vision is restricted by a polygonal restrictor so that the pyrometer, hereinafter also referred to as the wafer pyrometer, measures a constant intensity of the heat radiation reflected by the wafer despite any vibrations or tilting in the substrate when the migration of the virtual lamp images caused by vibrations or tilting is not greater than the boundary lines of a polygonal stage or step that is perpendicular to the lamp images.

The polygonal restrictor produces a polygonally restricted, multi-stage field of vision of the wafer pyrometer. In contrast, a rectangular field of vision is created in the case of the rectangular shield, and a largely rectangular field of vision is created in the case of the cylindrical lens.

Preferably the wafer is heated by heat sources such as, for instance, lamps. The heat sources are preferably longitudinally extended heating elements. Virtual images of these heating elements are created by the wafer so that, as with a mirror, longitudinally extended virtual images of the heating elements are produced by the wafer.

The restriction in the field of vision of the wafer pyrometer should occur in general such that the lamp images intersect at right angles the boundary lines of the field of vision of the wafer pyrometer. Due to the straight-line restriction of the field of vision, the radiation falling on the wafer pyrometer does not change when the wafer vibrates or tilts. In conventional round shields, a change in the light intensity falling on the wafer pyrometer would occur if the wafer vibrated or tilted.

In order to eliminate the lamp radiation from the intensity determined by the wafer pyrometer, the heat radiation of the lamps is forwarded, for instance in a fan-like manner, via a plurality of channels to an additional radiation detector, preferably a pyrometer, and the intensity thus measured is used for correcting the intensity measured by the wafer pyrometer. This radiation detector is hereinafter referred to as a lamp pyrometer. An imaging means, preferably a cylindrical lens, which restricts the field of vision of the lamp pyrometer to a largely rectangular shape, can be inserted upstream of the lamp pyrometer.

It is also possible to provide a plurality of wafer pyrometers that also measure the wafer radiation overlaid by the lamp radiation. Likewise, a plurality of lamp pyrometers can be provided.

For determining the substrate or object temperature, the measured intensity of the wafer pyrometer is compared to the measured intensity of the lamp pyrometer. This is not possible with a circular restriction in the field of vision of the wafer pyrometer using an apertured plate, in particular when wafer vibrations occur, because the intensity measured by the wafer pyrometer also fluctuates due to the apertured plate.

In one advantageous embodiment of the invention, an optical system, for instance a lens system, is located between the wafer and the wafer pyrometer, which system produces on the wafer pyrometer an optical image of the wafer surface restricted by the element. The restrictor is located preferably in the intermediate image plane of this lens system.

Preferably a device for rotating the wafer is provided for the inventive apparatus in order to heat the wafer surface uniformly.

In addition, the inventive apparatus can have not only one, but also a plurality of wafer pyrometers. The rectangular fields of vision of these wafer pyrometers are preferably parallel so that equivalent images of circumferential segments of the wafer surface are always formed on the wafer pyrometer when a wafer is rotated. Boundary lines of the rectangular fields of vision are then intersected at right angles by the lamp images. Since the wafer is being rotated, the parallel arrangement of the rectangular fields of vision is only required on a half-plane of the wafer. The fan of the lamp pyrometer is arranged in a corresponding manner so that again the intensity of the lamps can be clearly associated with the intensity of the rectangularly-restricted wafer surface. In this arrangement, it is sufficient to have a single lamp pyrometer that is allocated to the field of vision of at least one of the wafer pyrometers, provided the intensity is approximately constant across the length of the coil within a lamp.

The object is furthermore achieved by a method in which the field of vision of the wafer pyrometer is restricted in straight lines by the element between the wafer and the wafer pyrometer.

Because of the straight-lined restriction of the field of vision, the radiation falling on the wafer pyrometer does not change when the wafer vibrates or tilts. In conventional round shields, there would be a change in the light intensity falling on the wafer pyrometer when the wafer vibrated or tilted.

In accordance with one advantageous embodiment of the invention, the wafer is heated by at least one heat source spaced from the wafer. Since the radiation falling on the wafer from the heat source is reflected in a different direction when the wafer vibrates or tilts, when there is a straight-lined restriction in the field of vision there is thus no change in the radiation intensity for the radiation falling on the wafer pyrometer.

In one exemplary embodiment in which an optical imaging system, for instance a lens system, is located between the wafer and the wafer pyrometer and creates optical images on the wafer pyrometer of the wafer surface restricted by the element, the radiation falling on the wafer pyrometer from the wafer is restricted in straight lines by the image of the element, the advantages cited in the foregoing again being achieved.

In accordance with one additional advantageous embodiment of the method, the wafer is rotated during the radiation process by a rotation apparatus in order to achieve a temperature change in the wafer that is as uniform as possible and a temperature distribution across the wafer surfaces that is as uniform as possible. In this case it is advantageous when a plurality of wafer pyrometers and associated elements that linearly restrict the field of vision of the wafer pyrometer are provided that can lie parallel to one another.

One additional object of the invention is to provide an apparatus for measuring the temperature of substrates, hereinafter also called objects, in which the temperature determination is largely independent of changes in intensity in the heating apparatus and/or its virtual images, or that, in a second embodiment of the invention, for determining correction parameters, the electromagnetic radiation that reaches the first field of vision from at least one heating element is detected by a measuring apparatus up to an intensity-dependent function.

This object is achieved with an apparatus for measuring an object temperature of an object with at least one heating apparatus including at least one heating element for heating the object by means of electromagnetic radiation, with at least one first radiation detector that detects the radiation coming from the object within a first field of vision, whereby for determining correction parameters of a measuring apparatus the electromagnetic radiation reaching the first field of vision from at least one heating element is detected up to an intensity-dependent function. This solution is hereinafter referred to as the second embodiment of the invention.

In accordance with the second embodiment of the invention, it is advantageous that changes in intensity (both in terms of space and in terms of time) of the heating apparatus and/or its virtual images (for instance due to wafer vibrations) do not affect the temperature measurement of the object. This is because the measured intensities experience the same relative changes from the heating apparatus as from its virtual images, and these are therefore synchronously detected both by the first radiation detector and by the measurement apparatus. This means that, for instance by finding ratios of intensity values, the effects of changes in intensity (both in terms of space and in terms of time) can be compensated in the temperature measurement. It is advantageous when the intensity-dependent function, which also includes an intensity-independent proportionality factor, is approximately equal for each heating element.

The measurement apparatus can include an impedance measurement of the heating elements in order to determine the intensity emitted by the heating elements via an impedance/intensity relation. Alternatively or additionally, thermocouples can be employed for measuring the temperature of the heating elements in order to determine the emitted intensity of the heating elements via an impedance/intensity relation.

Furthermore, the measurement apparatus can also include a second radiation detector, whereby the second radiation detector advantageously detects the radiation emitted by the heating elements within a second field of vision that also determines the intensity-dependent function or proportionality factor, whereby assuming an object acting as a mirror for the electromagnetic radiation, the first and the second fields of vision are almost identical in at least one physical dimension. In general the type of coincidence between the fields of vision of the first radiation detector(s) and second radiation detector(s) can be adapted to the geometry of the heat source or heating elements of the heat source.

It can furthermore be advantageous to measure the radiation coming from the object using a plurality of radiation detectors (second radiation detectors), whereby the fields of vision with respect to the object surface are limited to various surface regions of the object, and their fields of vision are approximately equal in at least one physical dimension to that of the field of vision of the second radiation detector. Analogously, a plurality of radiation detectors (first radiation detectors) can also be used for measuring the radiation emitted by the heating apparatus, for instance the individual heating elements.

A plurality of radiation detectors for measuring the radiation coming from the object is particularly advantageous when the object is rotatable by means of a rotation apparatus. Then surface regions of the object can be detected at different radial distances due to the arrangement of the second radiation detectors relative to the axis of rotation of the rotation apparatus, which makes it possible to acquire a radial temperature profile. It is this site-selective temperature determination of the object that makes it possible to adjust a radial temperature profile that is regulatable in wide limits across the wafers by controlling the heating elements of the heating apparatus, for instance of rod-shaped lamps, in particular halogen or arc lamps. It is advantageous when the electromagnetic radiation of each heating element is individually adjustable via a control apparatus.

Since for example temperature deviations from the target values of a 300 mm wafer at a mean wafer temperature of 1000° C. must, for example, be less than 2° C., it is necessary for the radiation detectors to detect the electromagnetic radiation with nearly absolute accuracy. This is made reliably possible by the described embodiments of the present invention.

It is furthermore advantageous when the fields of vision of the radiation detectors are adapted to the symmetry of the heating elements. Thus, for instance when rod-shaped heating elements are used, a rectangular field of vision, for instance, can be defined by suitable means such as restrictors and/or an optical imaging system comprising lenses, Fressnel lenses and/or zone plates. If the heating apparatus comprises rod-shaped heating elements arranged parallel to one another, the fields of vision of the radiation detectors are advantageously largely determined by cylindrical lenses arranged coaxially to the heating elements. This has the advantage that a field of vision opens perpendicular to the cylindrical lens axis, wherein the reflectivity of the object, which is integrated over a large angle, can be determined. Furthermore the determination of intensity using such fields of vision is not sensitive to vibrations in the object (wafer). In general the restriction of the fields of vision can be arranged such that, assuming an object that is reflective for the electromagnetic radiation of the heating apparatus, a minor displacement of a field of vision and the heating element relative to one another does not significantly affect the intensity measured by the radiation detectors. How this design is arrived at depends in general on the geometry of the heating apparatus and/or heating elements.

BRIEF DESCRIPTION OF THE DRAWINGS

The invention is explained in the following using preferred embodiments with reference to FIGS. 1 through 12. In the drawings.

DESCRIPTION OF PREFERRED EMBODIMENTS

Figure 1:
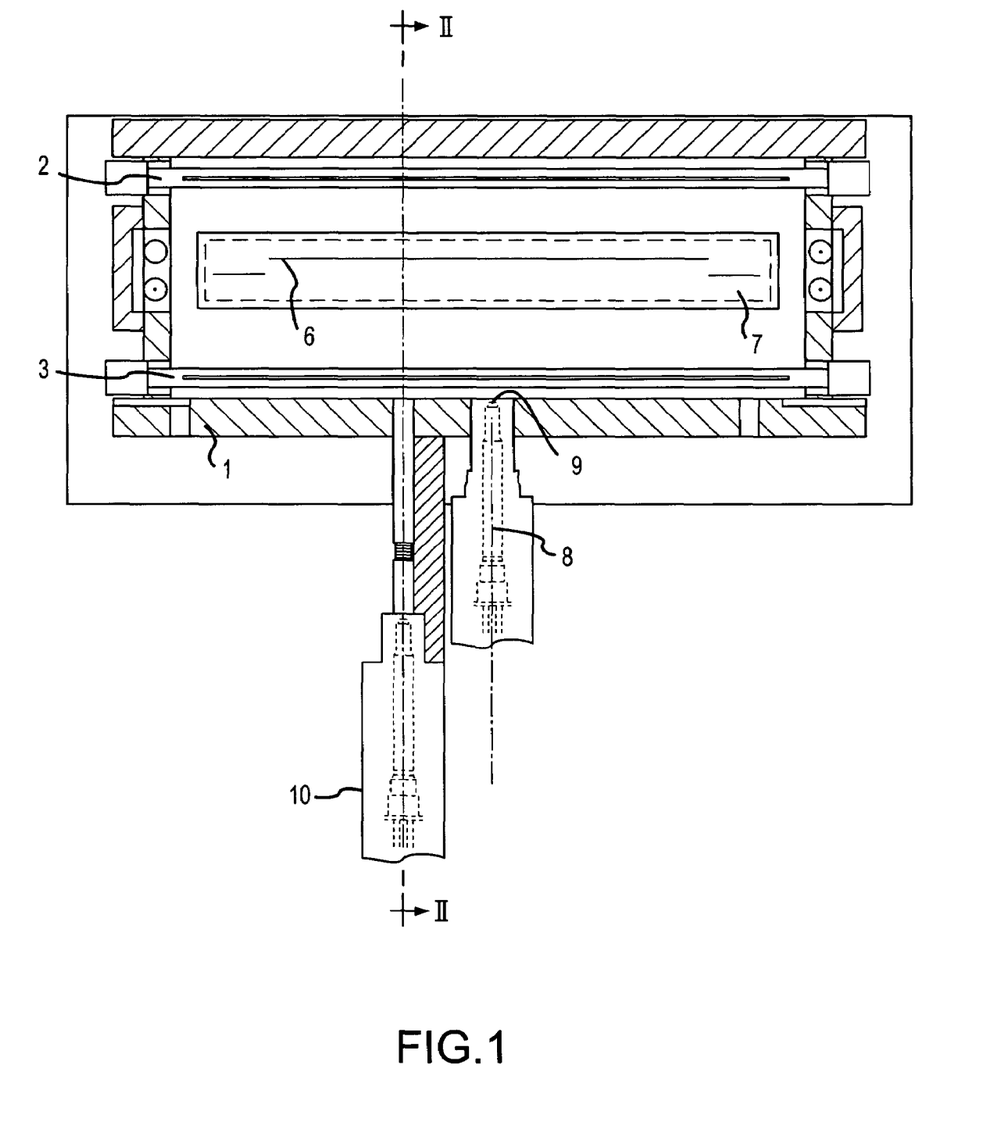
FIG. 1 is a cross-section through a device for the thermal processing of wafers for explaining the manner in which the inventive apparatus functions in accordance with a first embodiment of the invention.
Figure 2:
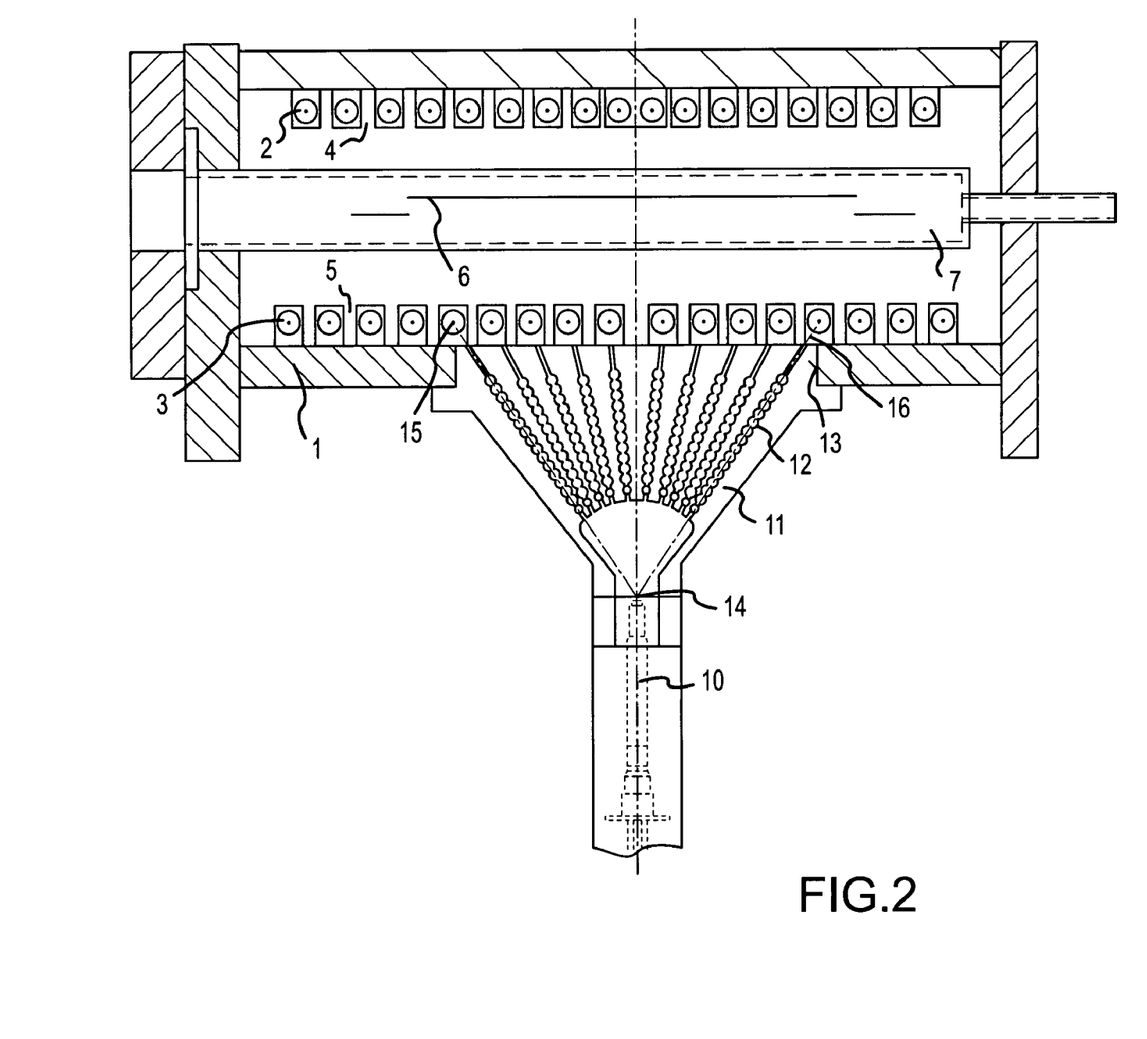
FIG. 2 is a section along line II-II in FIG. 1.

The rapid heating oven illustrated in FIGS. 1 and 2 has a housing 1, to the upper and lower interior wall of which are attached banks of lamps 4, 5 comprising a plurality of individual lamps or individual lamp tubes 2, 3, which heat a semiconductor wafer 6 that is arranged in a reaction chamber 7 between the banks of lamps 4, 5 in the housing 1.

Advantageously the reaction chamber 7 essentially comprises a material that is largely transparent for the lamp radiation, which material is also transparent with regard to the measuring wavelengths or measuring wavelength spectra of the pyrometers or the radiation detectors used. Using silica glass and/or sapphire, which have an absorption coefficient of approximately 0.1 1/cm to 0.001 1/cm determined via the lamp spectra, reaction chambers that are suitable for rapid heating systems can be built in which the thickness of the reaction chamber wall can be between 1 mm and several centimeters. The material can be selected in terms of the absorption coefficient depending on the thickness of the reaction chamber wall.

Chamber wall thicknesses that measure in centimeters are particularly required when an underpressure, if necessary all the way to an ultra high vacuum, or an overpressure is to be produced in the reaction chamber 7. If the diameter of the reaction chamber is approximately 300 mm, for instance, the chamber 7 has sufficient mechanical stability with a silica glass thickness of approx. 12 mm to 20 mm so that the chamber can be evacuated. The thickness of the reaction chamber wall 7 is dimensioned in conformity with the wall material, the chamber size, and the pressure loads.

Preferably used for lamps are halogen lamps whose filament structure is helical, at least in part. A partially helical structure makes it possible advantageously to achieve certain pre-defined geometric and spectral radiation profiles of the lamp. The lamp filament can include, for instance, alternating helical and non-helical filament segments. Both the geometric and the spectral radiation profiles in this case are largely determined by the distance between adjacent helical filament segments. Another option for defining the lamp radiation profile is, for instance, to vary the thickness of the filament structure, the helix thickness, along the filament.

If the lamp profile is to be controllable, lamps with a plurality of individually controllable filaments, preferably rod lamps, can be employed. Lamps with a controllable lamp profile are particularly advantageous in rapid heating systems for heat processing of large-surface substrates, such as, for instance, 300 mm semiconductor wafers, since a very homogeneous temperature profile can be obtained along the substrate surface using these lamps and a suitable lamp control apparatus. Superimposing the individual radiation profiles of the filaments results in an overall radiation profile of the lamp that can be adjusted in broad ranges. In the simplest case, a halogen lamp, for instance, includes two filaments, each with a helical structure or at least a partially helical structure, for instance, whereby the helix thickness and/or the distance of the helical filament segments of the first filament from the first end to the second end of the lamp increases, and the helical thickness and/or distance from the helical filament segments of the second filament decreases inversely from the first to the second end of the lamp. The overall radiation profile can thus be varied in broad ranges by the selection of the current strength in the two filaments. Another embodiment option for a lamp with controllable radiation profile is that the filament of the lamp includes at least three electrical terminals, whereby different operating voltages are applied between each of the terminals. This permits control of the filament temperature, by segment, and thus of the radiation characteristics of the lamp along the filament.

Alternatively to the lamps described in the foregoing, plasma or arc lamps can also be employed, whereby the radiation profile is adjustable in this case, as well. Thus, for instance, the lamp spectrum can be adjusted via the current density from the UV range down nearly to infrared.

Figure 7:
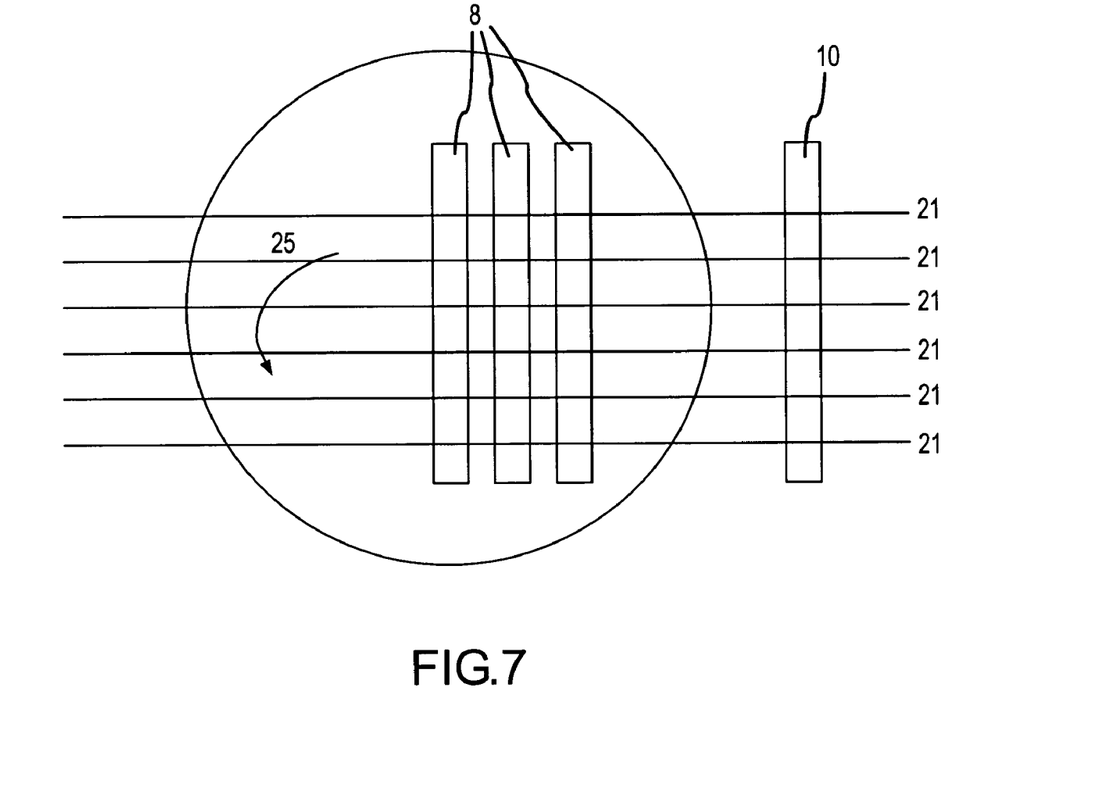
FIG. 7 is a drawing of an embodiment with a plurality of wafer pyrometers.
Figure 9:
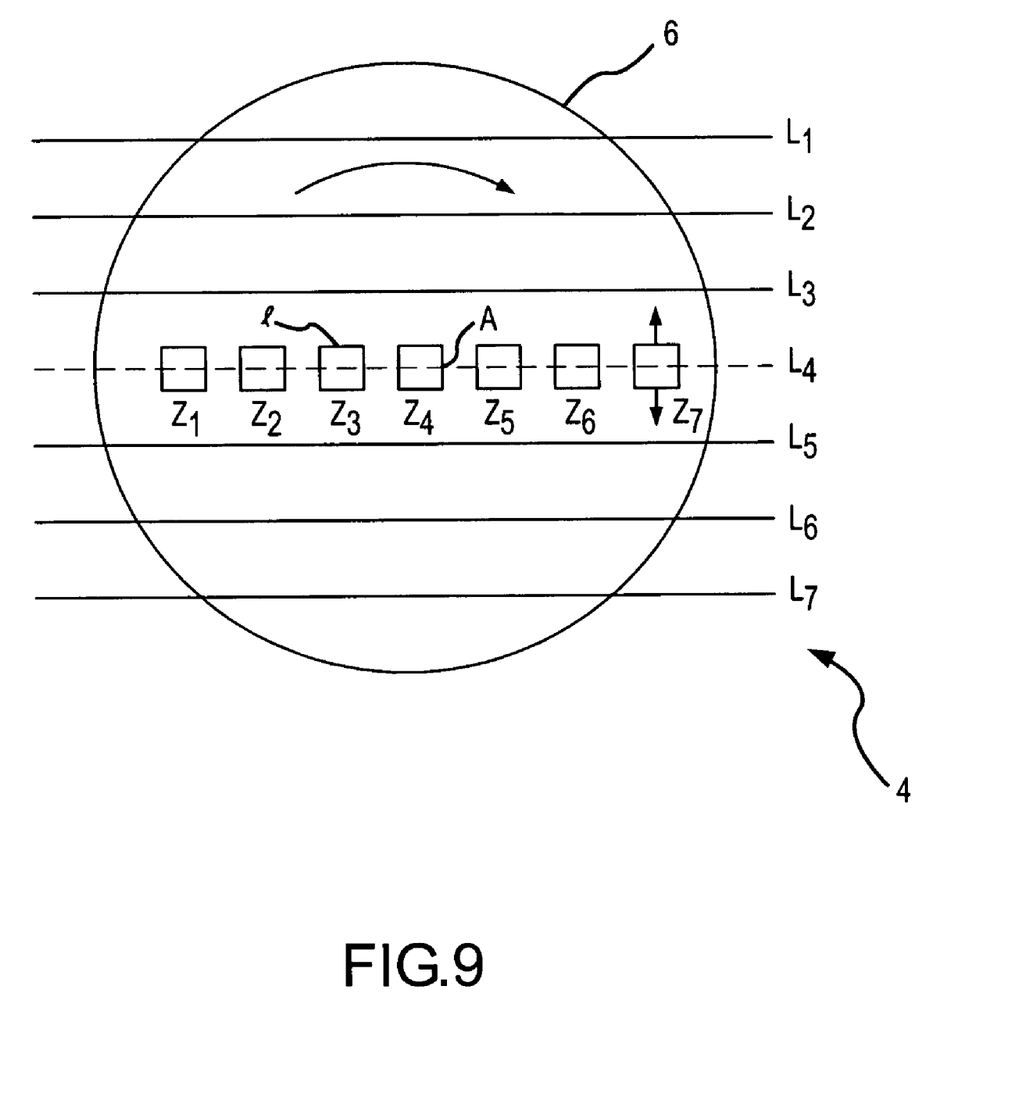
FIG. 9 is a top view of a schematic drawing with a plurality of wafer pyrometers, the field of vision of which is largely determined by cylindrical lenses arranged coaxial to the rod-shaped lamps of the heating apparatus.

As can be seen in FIG. 1, a wafer pyrometer 8 that is arranged on the bottom side of the housing 1 measures, via a small opening 9, which is preferably but not necessarily formed in a housing wall in the center of the wafer 6 to be processed, the electromagnetic radiation that is emitted and reflected by the wafer 6. In addition, in the case of silicon wafers, transmitted light is also measured at temperatures below 600° C. However, it is also possible to employ a plurality of pyrometers arranged parallel to the wafer surface, as is illustrated in FIGS. 7 and 9 and as is described in the following.

Apparatus of the type described in the foregoing are described, for instance, in Applicant's DE 197 37 802 A, DE 197 54 385 A, and DE 197 54 386 A, not previously published, which are referenced here to avoid repetition and which are included in the content of the present application.

Arranged on the bottom side of the rapid heating oven is an optical radiation measuring apparatus that includes a pyrometer 10 and, as shown in FIG. 2, a channel body 11 in which radiation channels 12 are formed or milled in the shape of a fan. This pyrometer 10 measures the intensity of the electromagnetic radiation that is emitted by the lamps onto the wafer. Arranged on the side of the channel body 11 facing away from the bank of lamps is a lens system 14, preferably a cylindrical lens, such that its focal line is located at or in the vicinity of a site at which the axes of the radiation channels 13 intersect such that the radiation falling on the lens system 14 reaches the pyrometer 10. As can best be seen in FIG. 2, the radiation channels 12 in the channel body 11 are embodied or arranged such that the coil 15 of each individual lamp 3 lies on the extended longitudinal axis 16 of each radiation channel 12.

The radiation sources and/or the radiation channels are preferably arranged such that the lamp pyrometer signal results from a lamp or filament segment that is free of filament retention apparatus or other means that would have a negative effect on the flow of radiation or on the temperature of the filament or lamp segment observed through the radiation channels. The pyrometer 10 or its system of lenses 14 therefore "looks" precisely at each lamp coil 15, wherein background radiation, which does not come from the lamp coil 15, if it comes at all, makes up only a negligibly small portion of all of the light falling on the pyrometer 10, hereinafter also referred to as the lamp pyrometer. The background radiation can be deliberately masked using additional shields or coverings in the vicinity of the lamp coils and the radiation channels.

Figure 3:
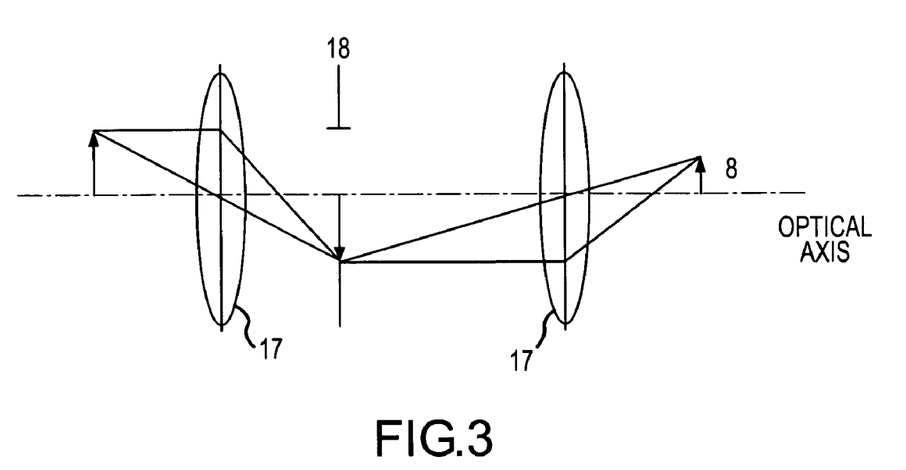
FIG. 3 is a schematic drawing of a lens system that can be employed in connection with the inventive apparatus.

FIG. 3 illustrates a lens system 17 that is located between the wafer 6 and the wafer pyrometer 8 and that creates an image of the wafer surface restricted by a shield or restrictor 18 on the wafer pyrometer 8. The restrictor 18 is preferably located in the intermediate image plane of the lens system 17.

Figure 4:
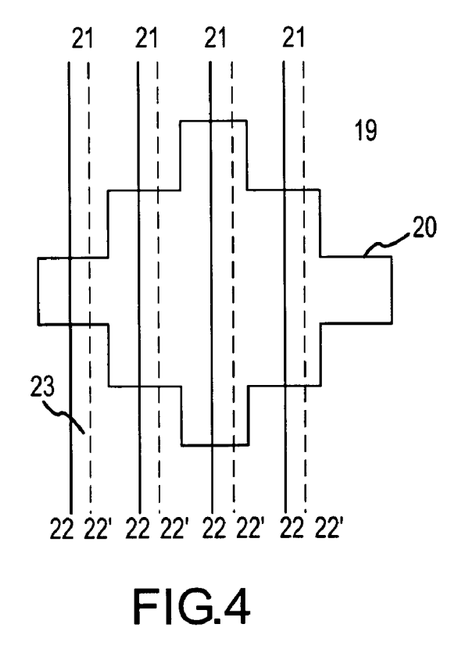
FIG. 4 is one exemplary embodiment for an element restricting the field of vision of the wafer pyrometer in the form of a polygonal shield or restrictor.

A polygonal restrictor 19 or rectangular restrictor is used for the restrictor, as illustrated in FIG. 4. The length of the straight-lined limit of one polygon stage or step 20 should be at least as long as the distance the lamp images 21 drift due to vibrations or tilts of the wafer 6. The arrow 23 is an exemplary illustration of the drifting of the lamp images 21 from the position 22 prior to tilting or vibrating to the position 22' after such tilting or vibrating. Based on the inventive measure of arranging the edges of the restrictor largely in a straight line to the direction of movement of the reflected image, no changes in intensity are caused by the tilting of the wafer pyrometer, in contrast to restrictors with curved edges, for instance apertured plates or elliptically shaped restrictors in which the intensity falling on the wafer pyrometer is a function of the positional displacement or vibration.

Figure 5:
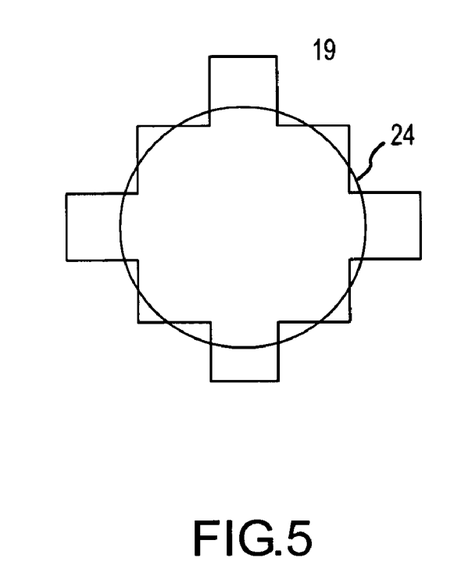
FIG. 5 is a schematic drawing for explaining the manner in which the inventive apparatus functions.

FIG. 5 demonstrates the size of the polygonal restrictor 19 compared to the previously used apertured plate 24. As can be seen from this figure, the surface area of the polygonal restrictor 19, which is integrated in the radiation measurement using the wafer pyrometer 8, is preferably the same as the corresponding integration surface area of the apertured plate 24 used in the past. This also applies to an elliptically shaped "apertured plate" and correspondingly to the rectangular restrictor.

Figure 6:
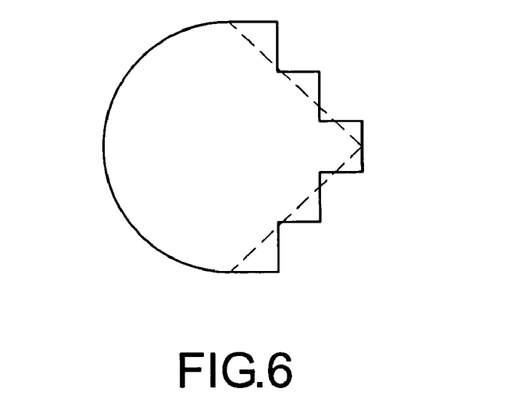
FIG. 6 is another embodiment of an element restricting the field of vision of the wafer pyrometer.

FIG. 6 illustrates another embodiment of a restrictor with polygonal limits. In this example, a quarter of a circle is used as a restrictor, the boundary lines of which are polygon stages rather than the normal straight lines.

A largely rectangular boundary of the field of vision of the wafer pyrometer 8 is also achieved in that a cylindrical lens 14 is positioned in front of the wafer pyrometer 8 rather than the rectangular restrictor located in the intermediate image of the lens system 17.

All of the embodiments of the element that restricts the field of vision of the wafer pyrometer 8 are designed such that the boundary lines of the field of vision are straight lines or, in the case of the cylindrical lens, are largely straight lines, whereby boundary lines of the field of vision preferably intersect the lamp images 21 largely at right angles in order to achieve the advantages of the invention cited in the foregoing.

An additional advantageous embodiment of the invention can be achieved in that a plurality of wafer pyrometers 8 with fields of vision that are parallel to one another are used in the inventive apparatus. FIG. 7 illustrates this situation. Again, the lamp images 21 intersect at right angles boundary lines of the fields of vision, in this instance, of the plurality of wafer pyrometers 8. In addition, the wafer 6 can be rotated during thermal processing and temperature measurement, as indicated by the arrow 25 in FIG. 7. It is sufficient to provide the fields of vision lying parallel to one another on only one half-plane if the wafer is rotated. In this arrangement, a single lamp pyrometer 10 is sufficient; it is allocated to the field of vision of one of the wafer pyrometers provided the intensity is constant across the length of the coil within one lamp.

Figure 8:
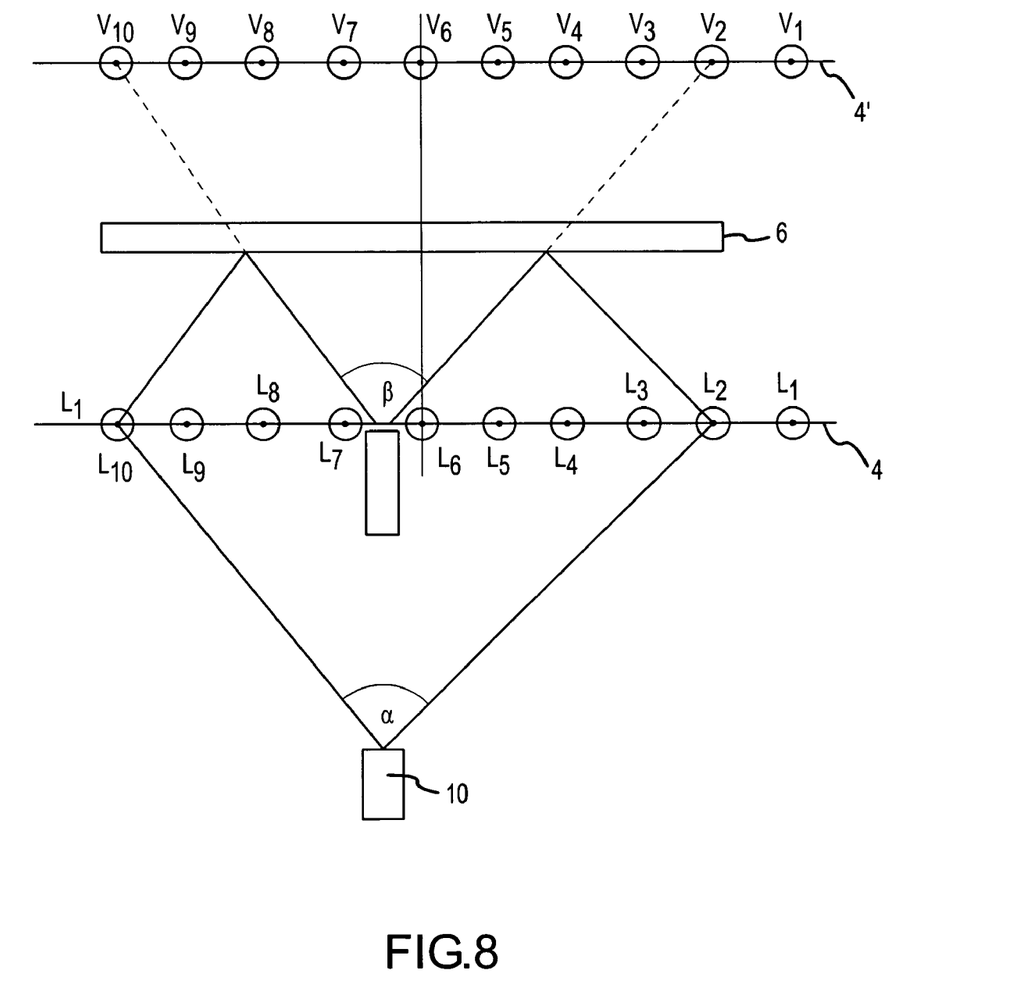
FIG. 8 is a schematic drawing of a heating apparatus with rod-shaped lamps arranged parallel to one another, and the virtual heat source, with the virtual lamp images, that results from the reflective effect of the object.

FIG. 8 is a drawing of a heating apparatus 4 comprising one bank of lamps with rod-shaped lamps L1 through L10 arranged parallel to one another. Arranged at a distance to the bank of lamps 4 is a wafer or an object 6 that partially reflects the electromagnetic radiation emitted by the bank of lamps and that is heated by this electromagnetic radiation. Likewise shown is a wafer pyrometer or a second radiation detector 8 that detects the radiation coming from the object. This radiation essentially constitutes the radiation emitted by the object and the reflected portion of the lamp radiation. In practice this reflection portion is approximately 30% for temperatures greater than 600° C. when using a silicon wafer. The virtual reflected images of the lamps L1 through L10 are likewise illustrated as V1 through V10 and constitute the virtual bank of lamps 4'. The wafer pyrometer 8 has a field of vision pre-determined by an angle β (first field of vision) and receives electromagnetic radiation that lies within this field of vision.

FIG. 8 illustrates another pyrometer, or a second radiation detector 10, that measures the radiation emitted directly by the lamps L1 through L10 of the heating apparatus 4. The radiation travels to the detector 10 preferably by means of the channel body 11 illustrated in FIG. 2. The pyrometer 10 also has a field of vision pre-determined by an angle α (second field of vision) that defines the number of lamps observed.

In order to measure the temperature of the object as precisely as possible, corresponding to the second embodiment of the present invention, the first and the second fields of vision of the lamp pyrometer 10 and the wafer pyrometer 8 are selected such that they are identical, at least in terms of physical dimensions, assuming an object 6 that reflects the electromagnetic radiation. In the example illustrated in FIG. 8, this means that essentially the same segment of the virtual reflected image 4' of the bank of lamps 4 is detected by the wafer pyrometer that corresponds to the segment of the heating apparatus 4 that is detected by the lamp pyrometer 10. If, as in FIG. 8, the lamps are rod shaped and emit radiation largely homogeneously in the axial direction, it is sufficient when the segments of the images detected by the lamp and wafer pyrometers 10, 8 are approximately the same in the direction perpendicular to the axes of the lamps. This can be achieved by arranging the pyrometers appropriately, e.g., equivalent angles α and β.

Advantageously the fields of vision of the pyrometers 8, 10 in the illustrated example are essentially established using cylindrical lenses whose focal lines run parallel to the rod-shaped lamps L1 through L10. These cylindrical lenses or another suitable imaging means, or the addition of restrictors, make it possible to establish the aperture angles α and β. If the radiation intensity of the lamps along the lamp axis is approximately constant (which is true in general for one filament segment), cylinder lenses with different focal line lengths can be used for the pyrometers 8, 10, since, as described in the foregoing, it is sufficient when the fields of vision of the pyrometers 8 and 10 are approximately equal, at least in terms of physical dimensions, in the direction perpendicular to the lamp axis. This ensures that both the physical changes and changes over time in the intensities of the lamps and the virtual lamp images are detected synchronously, both by the wafer pyrometer and by the lamp pyrometer, down to a proportionality factor.

According to the present invention, in addition to the aforesaid angles α and β, for instance, which define a plane perpendicular to the direction of the lamp axis, alternatively or in addition thereto the opening angles of the wafer pyrometer and lamp pyrometer can also be selected approximately equal, that is, for instance, in the direction of the axis of the cylindrical lenses. This depends largely on how constant the lamp intensity is along the lamp axis and on the measuring accuracy required for the object temperature.

FIG. 9 is a schematic drawing of a top view of a wafer 6 and a bank of lamps 4 with rod-shaped lamps L1 through L7 that are arranged parallel to one another. The wafer can be rotated about the axis A by a rotation mechanism. FIG. 9 illustrates the application of a plurality of wafer pyrometers, each provided with cylindrical lenses Z1 through Z7. The axes of the cylindrical lenses are oriented parallel to the lamp axes, wherein the wafer temperature can be detected radially, similar to FIG. 7.

In contrast to FIG. 7, the wafer pyrometers in accordance with FIG. 9 are arranged along the diameter of the wafer, whereby when there is an asymmetrical arrangement with regard to the axis of rotation the advantage results that even for wafers with small diameters the radial temperature profile can be measured at a sufficient number of sites without making the axial length of the cylindrical lenses too small.

With a regulating apparatus, a bank of lamps can be controlled by means of the radial temperature profile, whereby it is advantageous when each individual lamp can be individually controlled. This permits a temperature distribution across the wafer to be achieved that is as uniform as possible. It should be mentioned again that in particular with individual lamp control the equivalence of the fields of vision (precisely identical down to an intensity-dependent function or a proportionality factor) of wafer and lamp pyrometers is a necessary requirement for a high degree of measuring accuracy since this is the only way that the intensity reflected by the wafer can be corrected properly.

In accordance with the second embodiment of the invention, equivalence of the fields of vision should be taken to mean that the fields of vision of the wafer and lamp pyrometers are nearly identical in the direction of inhomogeneous intensity distributions of the heating apparatus down to a proportionality factor (that can also be 1) or in general down to a known intensity-dependent function. In general the fields of vision are advantageously adapted to the symmetry of the radiation characteristics of the heating apparatus. This can occur, for instance, due to the selection of suitable field of vision restrictor or imaging means, such as, for instance, a polygonal restrictor corresponding to the first embodiment of the invention or, for instance, a cylindrical lens. This means, for instance, that it can be achieved that the intensity measured by the radiation detectors is largely unaffected when there is a slight displacement of the fields of vision and the heating elements relative to one another. The term heating elements also includes any virtual images of the heating apparatus that occur due to a partial reflection on the object.

Figure 12:
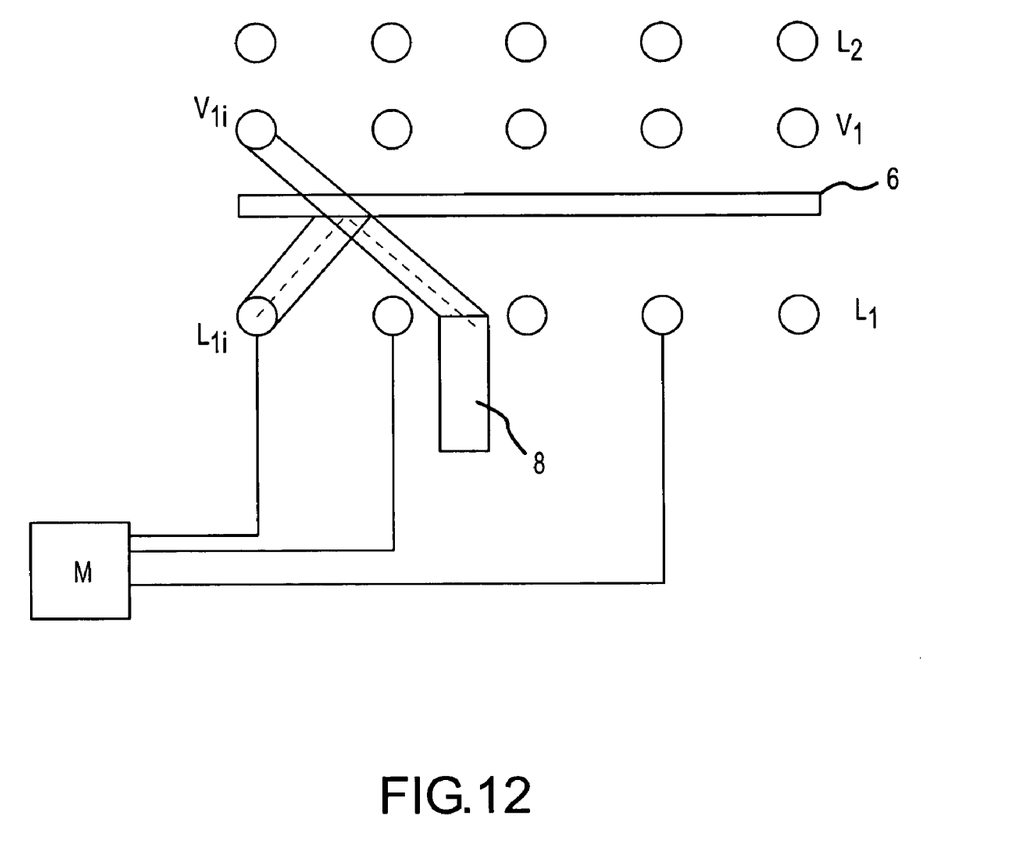

As FIG. 12 clarifies, in accordance with the second embodiment of the invention, in general the second radiation detector (the lamp pyrometer) can be replaced by a measuring apparatus M that detects the electromagnetic radiation I1$_i$ from the heating elements L1$_i$ of the heat source L1, preferably the electromagnetic radiation from each heating element L1$_i$, that reaches the first field of vision of the radiation detector 8 down to a proportionality factor or a known intensity-dependent function. Due to the reflecting properties of the object (for instance, wafer) 6, the radiation detector 8, in addition to measuring radiation $I_{em}$ emitted by the object 6 into the first field of vision, also measures a radiation $I1_i*r_i$ reflected by each heating element $L1_i$ of the bank of lamps L1, which seems to be emitted from its virtual images $V1_i$. $r_i$ is an effective reflection coefficient relative to the heating element $L1_i$.

The radiation detector 8 thus measures overall the intensity $I_{total} = I_{em} + \Sigma I1_i*r_i$. It is assumed as a simplification that the object 6 is opaque for the radiation of the upper bank of lamps L2 (the virtual image of which is not illustrated).

For determining the intensity $I_{em}$ emitted by the wafer, therefore, a reflective portion $\Sigma I1_i*r_i$ must be corrected. The measuring apparatus M in general measures the intensity $I_M = c_i*I1_i$ for a heating element $L1_i$, whereby $c_i$ is a constant predetermined by the measuring apparatus or is a known intensity-dependent function that can be determined, for instance, in a calibration process.

The measuring apparatus M can include, for instance, an impedance measurement of the heating element, preferably the lamp filaments, or the filament temperature of the lamps, for instance, can be determined by suitable attached thermocouples, whereby the functions or constants $c_i$ are then measured, for instance via impedance/intensity ratios or temperature/intensity ratios.

In accordance with the invention, $c_i*I1_i = k_i*I1_i*r_i$, whereby $k_i$ is an intensity-dependent function associated with the heating element $L1_i$ or is a proportionality factor. Preferably the measuring apparatus is selected such that the $k_1$ for all heating elements $L1_i$ are approximately equal (allowing for measuring errors), which makes the calibration process in particular substantially simpler. For instance, with the embodiment illustrated in FIG. 8, this can be achieved with $\alpha = \beta$. Thus, when $c_i/k_i$ or $c_i$ and $k_i$ are known, the reflection portion of the intensity detected by the radiation detector 8 can be corrected using the measuring apparatus and the temperature of the object can then be measured using the intensity $I_{em}$ emitted by the wafer.

In order to increase the accuracy of the object temperature even further, the first and second embodiments of the invention can be advantageously combined with one another.

The invention has been described using preferred exemplary embodiments. However, one skilled in the art will be able to find numerous modifications and embodiments without departing from the inventive concept.

The specification incorporates by reference the disclosure of German priority documents 199 05 524.6 of 10 Feb. 1999 and PCT/EP00/00375 of 19 Jan. 2000.

The present invention is, of course in no way restricted to the specific disclosure of the specification and drawings, but also encompasses any modifications within the scope of the appended claims.

What is claimed is:

1. An apparatus for measuring an object temperature of an object, comprising:
   at least one heating apparatus having at least one heating element for heating an object via electromagnetic radiation;
   at least one first radiation detector that detects radiation coming from said object within a first field of vision;
   for determining correction parameters, a measuring device that detects the electromagnetic radiation that reaches said first field of vision from said at least one heating element up to a proportionality factor or a known intensity-dependent function;
   wherein said measuring device includes an impedance measurement of said heating elements or a thermocouple for measuring the temperature of said heating elements; and
   at least one restrictor that restricts said field of vision of said radiation detector;
   wherein said restrictor comprises essentially linear and stepped edges.

2. An apparatus for measuring the temperature of an object, the apparatus comprising:
   at least one heating apparatus having at least one heating element for heating an object via electromagnetic radiation;
   at least one first radiation detector that detects radiation coming from said object within a first field of vision;
   for determining correction parameters, a measuring device that detects the electromagnetic radiation that reaches said first field of vision from said at least one heating element up to a proportionality factor or a known intensity-dependent function;
   wherein said heating apparatus includes at least one filament having an at least partially helical filament structure; and
   at least one restrictor that restricts said field of vision of said radiation detector;
   wherein said restrictor comprises essentially linear and stepped edges.

3. An apparatus according to claim 2, wherein a pre-determined geometrical and spectral radiation profile is achievable by the filament structure of said heating apparatus.

4. An apparatus according to claim 3, wherein a filament of said heating apparatus includes alternating helical and non-helical filament structures.

5. An apparatus according to claim 2, wherein said heating apparatus includes two individually controllable filaments, or wherein at least one filament has at least three electrical terminals.

6. An apparatus according to claim 2, wherein at least one filament structure has a thickness along the filament that varies.

7. An apparatus for measuring the temperature of an object, the apparatus comprising:
   at least one heating apparatus having at least one heating element for heating an object via electromagnetic radiation;
   at least one first radiation detector that detects radiation coming from said object within a first field of vision; and
   for determining correction parameters, a measuring device that detects the electromagnetic radiation that reaches said first field of vision from said at least one heating element up to a proportionality factor or a known intensity-dependent function;
   wherein the measuring device includes a second radiation detector,
   wherein said heating apparatus and a channel body are disposed relative to one another in such a way that said second radiation detector generates a signal that is free from effects of filament retaining mechanisms or other means that adversely affect the radiation temperature of said heating apparatus and
   at least one restrictor that restricts said field of vision of said radiation detector;
   wherein said restrictor comprises essentially linear and stepped edges.

* * * * *